(12) United States Patent
Gong et al.

(10) Patent No.: US 7,962,106 B2
(45) Date of Patent: Jun. 14, 2011

(54) RADIO WITH A KEY AND KNOB COMBINATION

(75) Inventors: Gaochao Gong, Shenzhen (CN); Weilin Li, Shenzhen (CN); Yuzhong Wu, Shenzhen (CN); Haibo Liao, Shenzhen (CN)

(73) Assignee: Hytera Communications Corp., Ltd., Shenzhen (CN)

( * ) Notice: Subject to any disclaimer, the term of this patent is extended or adjusted under 35 U.S.C. 154(b) by 554 days.

(21) Appl. No.: 12/134,189

(22) Filed: Jun. 6, 2008

(65) Prior Publication Data

US 2009/0197545 A1   Aug. 6, 2009

(51) Int. Cl.
*H04B 1/38* (2006.01)

(52) U.S. Cl. .......... 455/90.2; 455/90.3; 455/575.1; 455/518; 345/184; 200/341

(58) Field of Classification Search .......... 455/90.2, 455/90.3, 575.1, 518; 345/184; 200/341
See application file for complete search history.

(56) References Cited

U.S. PATENT DOCUMENTS

| | | | | |
|---|---|---|---|---|
| 4,147,904 A | * | 4/1979 | Carpenter et al. | 381/355 |
| 6,660,947 B1 | * | 12/2003 | Badescu | 200/4 |
| 6,696,915 B2 | * | 2/2004 | Pan | 338/198 |
| 2006/0012584 A1 | * | 1/2006 | Vassallo et al. | 345/184 |

* cited by examiner

*Primary Examiner* — Sanh D Phu
(74) *Attorney, Agent, or Firm* — Global IP Services; Tianhua Gu

(57) ABSTRACT

The present invention relates to a radio with a key and knob combination. To solve problems such as inconvenience caused by the independent PTT key and volume control knob on the traditional radios, the present invention provides a radio with a key and knob combination, comprising a PPT key unit and a volume control unit, wherein the key is installed inside a central cavity of the knob, which is a hollow knob, to form the key and knob combination. Rotation of the knob (106) may drive the shaft (102) and the toggle piece (111) to rotate synchronously, and then toggle the volume switch (112), while the pressed key (101) may cause the shaft (102) moving axially to toggle the PTT switch (103). When operating the radio with a single hand, users can both press the PTT key to initiate a call and rotate the knob to adjust the volume level by a thumb or a forefinger, and the operation is very convenient. Additionally, only an axle hole is required on the radio housing, thus the key and knob combination enhances the structural reliability of the radio.

10 Claims, 3 Drawing Sheets

RADIO WITH A KEY AND KNOB COMBINATION

CROSS REFERENCE TO THE RELATED PATENT APPLICATION

This patent application claims the priority of the Chinese patent application No. 200820092250.2 filed on Feb. 4, 2008, which application is incorporated herein by reference.

FIELD OF THE INVENTION

The present invention relates to portable radios, more particularly, to a radio with a key and knob combination.

BACKGROUND OF THE INVENTION

Radios usually have a PTT (Push-to-Talk) key for initiating a call, and a volume control knob for adjusting the volume level. As for the conventional products, a PTT key 201 and a volume control knob 202 are independent components in the radios, as shown in FIG. 1, wherein the PTT key 201 is located at the left side of the radio, and the volume control knob 202 is located at the top of the radio.

Practically both the PTT key and the volume control knob are frequently used, but they are inconvenient for one-hand operation because they are independent with each other. In addition, two openings on the housing of the radio are required for installing both the PPT key and the volume control knob. This design shall affect structural reliability of the radio.

SUMMARY OF THE INVENTION

The present invention is intended to solve problems caused by the independent PTT key and volume control knob, such as operation inconvenience and less structural reliability.

According to an aspect of the present invention, a radio with a key and knob combination is provided, comprising a housing, a PTT key unit, a volume control unit and operating circuits arranged in the housing, and the volume control unit includes a knob and a volume switch, the PTT key unit includes a key and a PTT switch; wherein the PTT key unit and the volume control unit are combined together, and the key is installed inside a central cavity of the knob, which is a hollow knob, to form the key and knob combination.

Advantageously, an axle hole is provided at a position on the housing where the key and knob combination is installed; a shaft on the inner side of the key passes through the axle hole and is capable of moving inward to toggle the PTT switch; and an elastic sheet that pushes the key outwards when being pressed is arranged on the shaft. Preferably, a clamp used to limit displacement of the shaft is located on the shaft near the inner surface of the housing. Preferably, a waterproof ring is placed on the shaft, closely matching the inner side of the axle hole.

Advantageously, a torsion spring that restores the rotated knob to a release position is located between the knob and the housing; a toggle piece that rotates synchronously with the shaft is placed on the shaft inside the housing; the knob is latched with the key and with the shaft through radial latch structures, enabling the knob, the key, the shaft and the toggle piece rotating synchronously, and then driving the toggle piece to toggle the volume switch.

Advantageously, at lease a slot is formed on the inner circumference surface of the knob, and a bayonet pin is extended inward from the outer flange of the key, and inserted into the corresponding slot.

Advantageously, protrusions are formed on the outer surface of the knob for users to manually rotate the knob.

According to the above technical solutions of the present invention, the PTT key unit and the volume control unit are combined together, wherein rotation of the knob may drive the shaft and the toggle piece to rotate synchronously, and then the toggle piece toggles the volume switch, while the pressed key may cause the shaft moving axially to toggle the PTT switch. When operating the radio with a single hand, users can both press the PTT key to initiate a call and rotate the knob to adjust the volume level by a thumb or a forefinger, and the operation is very convenient. Additionally, only an axle hole is required on the radio housing, thus the key and knob combination enhances the structural reliability of the radio.

BRIEF DESCRIPTION OF THE DRAWINGS

Embodiments in accordance with the present invention are described below with reference to the following drawings.

DETAILED DESCRIPTION OF THE INVENTION

Figure 1:
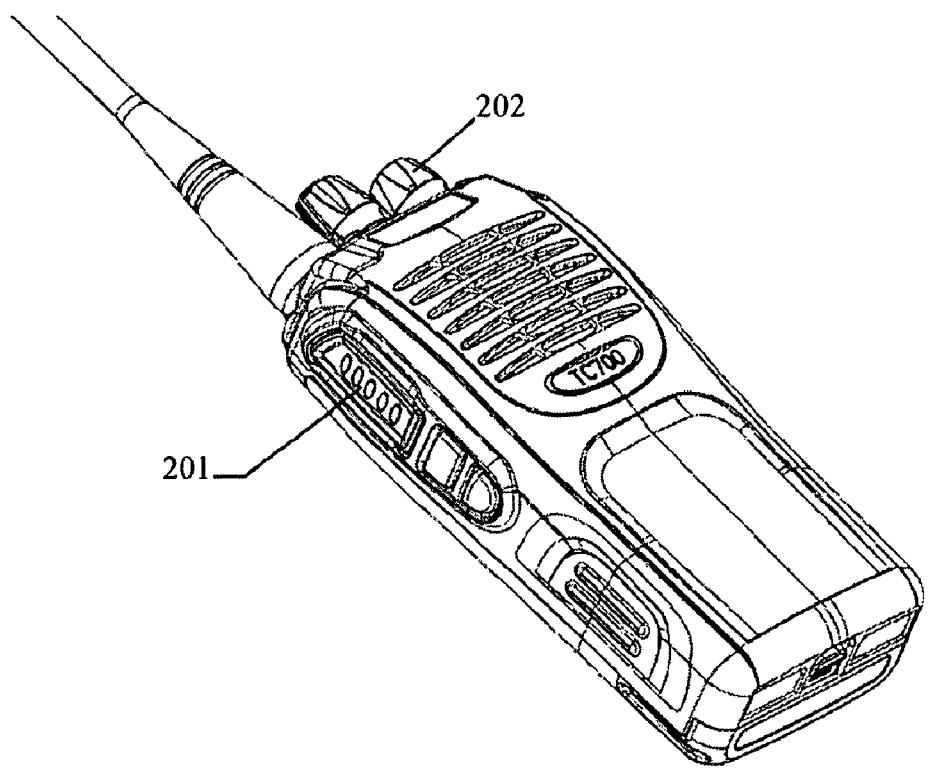
FIG. 1 is a diagram of a traditional two-way radio.
Figure 2:
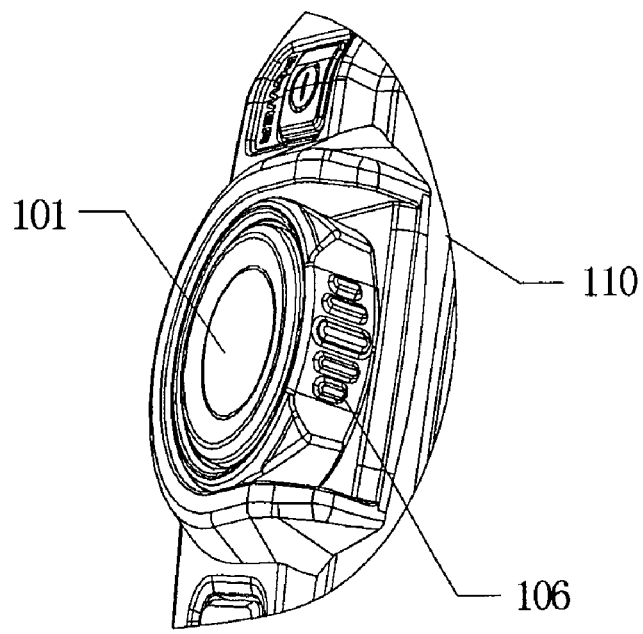
FIG. 2 is a partial perspective view of a key and knob combination in accordance with a preferred embodiment of the present invention.
Figure 3:
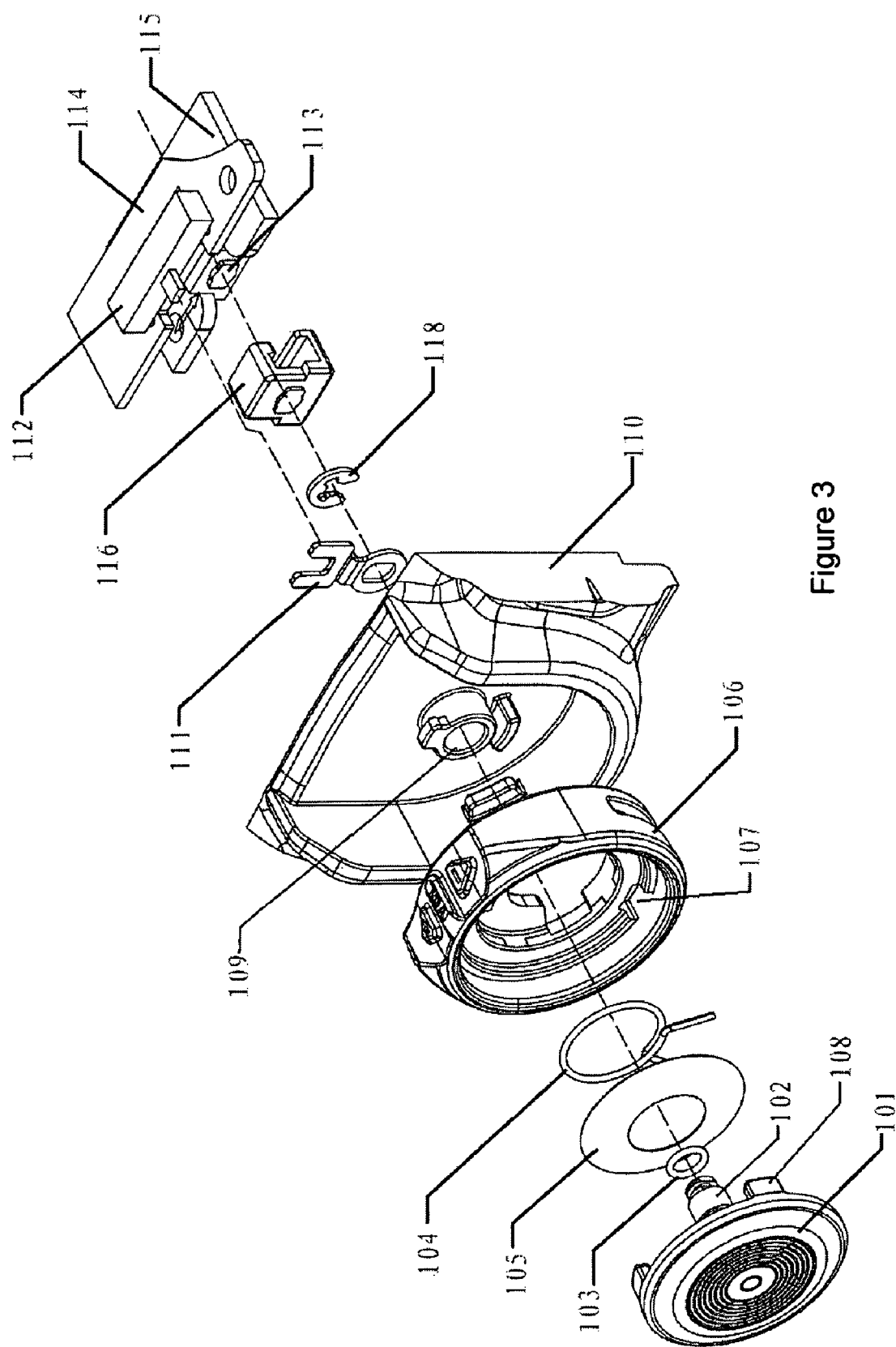
FIG. 3 is an exploded view of a key and knob combination in accordance with another preferred embodiment of the present invention.
Figure 4:
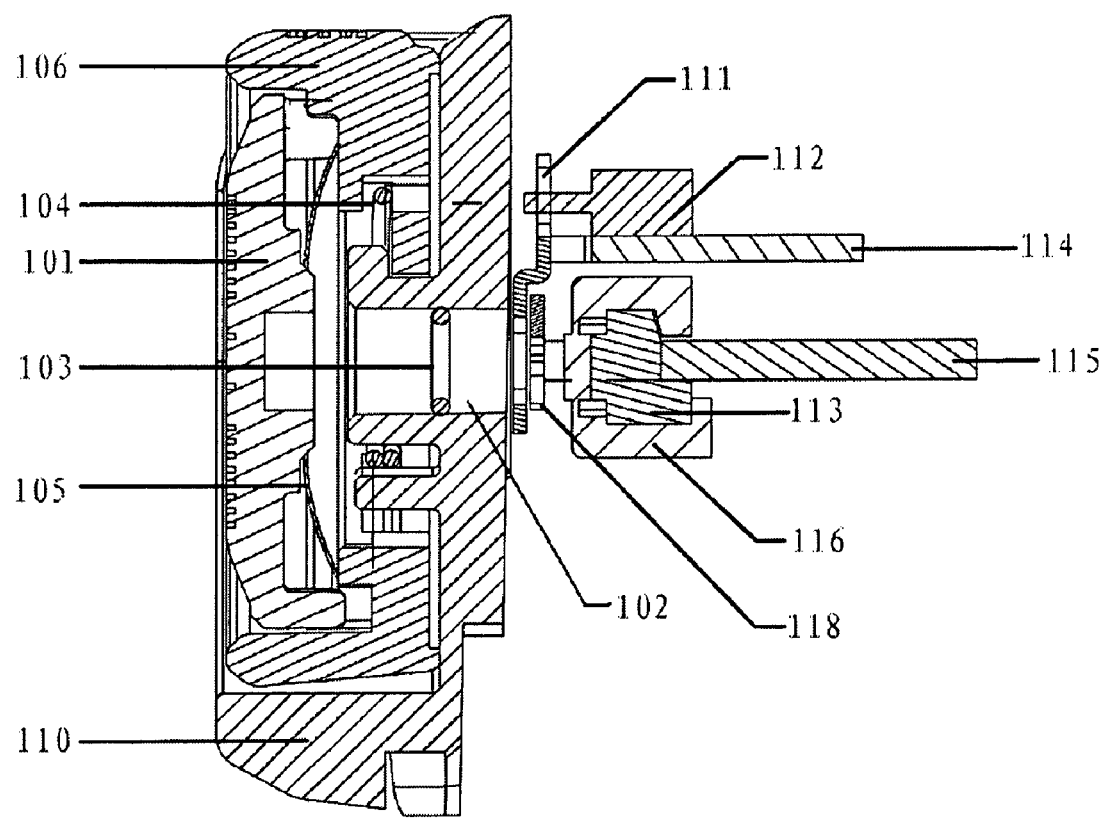
FIG. 4 is a sectional view of the key and knob combination shown in FIG. 3.

One preferred embodiment of the present invention is shown in FIG. 2, wherein a key and knob combination is arranged on the left side of the radio. Another preferred embodiment is shown in FIG. 3 and FIG. 4. The two preferred embodiments show the same internal structure. The only difference between the two preferred embodiments is the protrusions on the surface of the knob 106. FIG. 2 shows axial stripes, and FIG. 3 shows up/down arrowheaded protrusions.

In the embodiment as shown in FIGS. 3 and 4, the volume switch 112 is a toggle switch mounted on the volume switching circuit board 114, and the PTT switch 113 is a push switch mounted on the PPT switching circuit board 115. In various embodiments of the present invention, other switches of the same kind that are used on existing products may also be used.

In the present embodiment, the key and knob combination mainly includes a key 101, a shaft 102, a waterproof ring 103, a metal torsion spring 104, an elastic metal sheet 105, a knob 106, a toggle piece 111, a volume switch 112, a PTT switch 113, a volume switching circuit board 114, a PTT switching circuit board 115, a silica rubber protection pad 116, a clamp 118 and etc. As shown in FIG. 4, the PTT switch is installed inside the silica rubber protection pad 116.

As shown in FIGS. 3 and 4, there's an axial hole 109 at a position on the housing 110 where the key and knob combination is installed. The key 101 has a round surface, and the shaft 102 is located on the inner side of the key 10 and passes through the axial hole, with its front end being capable of moving inward to toggle the PTT switch 113. An elastic metal sheet 105 is arranged on the shaft, which shall push the key outwards when it is pressed. A waterproof ring 103 that closely matches the inner side of the axle hole is also arranged on the shaft 102, to prevent water from flowing into the housing. In various embodiments, a ring slot may be provided on the shaft for installing the water proof ring.

The torsion spring 104 is located between the knob and the housing, facilitating the rotated knob returning to a release position. A toggle piece 111 that rotates synchronously with the shaft is placed on the shaft 102 inside the housing. The knob 106, the key 101, the shaft 102 and the toggle piece 111 can rotate synchronously through their cooperation, and then the toggle piece is driven to toggle the volume switch 112.

In the present embodiment, a radial latch structure is provided between the knob and the key in order to realize a synchronous rotation between the knob, the key, the shaft and the toggle piece, wherein at least a slot 107 is formed on the inner circumference surface of the knob, and a bayonet pin 108 is extended inward from the outer flange of the key. When assembled the bayonet pin is inserted into the corresponding slot to form the said latch structure. In various embodiments, other structures and configurations may be used for the synchronous rotation between the knob, the key, the shaft and the toggle piece. For example, the shaft may be directly driven to rotate synchronously with the knob by an axial protruding part on the shaft latching into an axial slot on the inner side of the axial hole. Alternatively, the inner cavity of the knob has a non-circular shape, such as a rectangle shape, and the key also has a corresponding similar shape, then the knob can drive the key to rotate, and in turn cause the shaft and the toggle piece rotating.

Protrusions are provided on the outer surface of the knob for users to manually rotate the knob. Such protrusions may be stripes parallel with the axis as shown in FIG. 2, or arrowheaded protrusions as shown in FIG. 3.

As shown in FIG. 3, there's a clamp 118 on the shaft at the inner side of the toggle piece 111. The clamp (or blocker) is used to prevent the shaft from moving outwards.

In the embodiments of the present invention, the plunger key is integrated with the rotary knob, to construct a key and knob combination. As for practical implementation, when the PTT key is pressed, it may overcome elastic force generated by the elastic sheet 105 to make a displacement, causing the shaft 102 moving axially to finally toggle the PTT switch. When pressure on the PTT key is removed, the elastic sheet 105 recovers and the PTT key also returns to its initial position. On the other hand, when the knob 102 is rotated, it drives the shaft 102 and the toggle piece 111 rotating synchronously, and in turn toggling the volume switch 112 to adjust the volume level. When the force acted on the knob is removed, the torsion spring 104 recovers and pulls the knob returning to the initial position.

In accordance with the embodiments of the present invention, users can press the PTT key to initiate a call or rotate the knob to adjust the volume level through a thumb or a forefinger when operating the radio with a single hand, and the operation is very convenient. Further, the shaft 102 acts as a carrier of axial pressure and also rotation, thus only one axial hole is required on the radio housing, to improve the structural reliability of the radio.

What is claimed is:

1. A radio with a key and knob combination comprising a housing, a PTT key unit, a volume control unit, and operating circuits arranged in the housing, the volume control unit includes a knob and a volume switch, the PTT key unit includes a key and a PTT switch; wherein the PTT key unit and the volume control unit are combined together, the knob is a hollow structure, the key is installed inside a central cavity of the knob, to form the key and knob combination.

2. The radio with a key and knob combination according to claim 1, wherein the housing has an axle hole located at a position where the key and knob combination is installed; a shaft on the inner side of the key passes through the axle hole and is capable of moving inward to toggle the PTT switch; and an elastic sheet for pushing the key outwards when being pressed is arranged on the shaft.

3. The radio with a key and knob combination according to claim 2, wherein a clamp used to limit displacement of the shaft is set on the shaft near the inner surface of the housing.

4. The radio with a key and knob combination according to claim 3, wherein a waterproof ring is placed on the shaft, and contacts with the inner surface of the axle hole in a interference matching.

5. The radio with a key and knob combination according to claim 4, wherein a ring slot is formed on the shaft and the water proof ring is placed in the ring slot.

6. The radio with a key and knob combination according to claim 2, wherein a torsion spring for returning the rotated knob to a release position is located between the knob and the housing; a toggle piece that rotates synchronously with the shaft is placed on the shaft inside the housing; the knob is latched with the key through a radial latch structure, which enables the knob, the key, the shaft and the toggle piece rotating synchronously, and then drives the toggle piece to dial the volume switch.

7. The radio with a key and knob combination according to claim 6, wherein at lease a slot is formed on an inner circumference surface of the knob, and a bayonet pin is extended inward from an outer flange of the key, and inserted into the corresponding slot to form the latch structure.

8. The radio with a key and knob combination according to claim 7, wherein protrusions are formed on the outer surface of the knob for users to manually rotate the knob.

9. The radio with a key and knob combination according to claim 2, wherein a torsion spring (104) for returning the rotated knob to a release position is located between the knob and the housing (106); a toggle piece (111) that rotates synchronously with the shaft is placed on the shaft (102) inside the housing; the knob (106) is latched with the shaft (102) through a radial latch structure, which enables the knob, the shaft and the toggle piece rotating synchronously, and then drives the toggle piece to dial the volume switch.

10. The radio with a key and knob combination according to claim 9, wherein protrusions are formed on the outer surface of the knob for users to manually rotate the knob.

* * * * *